US009105984B2

(12) United States Patent
Chang et al.

(10) Patent No.: US 9,105,984 B2
(45) Date of Patent: Aug. 11, 2015

(54) WIRELESS COMMUNICATION DEVICE WITH SLOT ANTENNA

(71) Applicant: Chiun Mai Communication Systems, Inc., New Taipei (TW)

(72) Inventors: Tze-Hsuan Chang, New Taipei (TW); Cho-Kang Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/036,137

(22) Filed: Sep. 25, 2013

(65) Prior Publication Data

US 2014/0315509 A1 Oct. 23, 2014

(30) Foreign Application Priority Data

Apr. 22, 2013 (TW) ............................ 102114172 A

(51) Int. Cl.

| | |
|---|---|
| ***H04M 1/00*** | (2006.01) |
| ***H01Q 1/38*** | (2006.01) |
| ***H01Q 13/10*** | (2006.01) |
| ***H01Q 5/321*** | (2015.01) |
| ***H01Q 5/55*** | (2015.01) |

(52) U.S. Cl.

CPC ............ *H01Q 13/103* (2013.01); *H01Q 5/321* (2015.01); *H01Q 5/55* (2015.01); *H01Q 13/10* (2013.01)

(58) Field of Classification Search

USPC .......... 455/575.7, 193.1, 269, 275, 282, 286, 455/288, 290; 343/702, 700 MS

See application file for complete search history.

(56) References Cited

U.S. PATENT DOCUMENTS

| | | | | |
|---|---|---|---|---|
| 7,129,902 | B2 * | 10/2006 | Bancroft ....................... | 343/767 |
| 8,373,910 | B2 * | 2/2013 | Iwasaki et al. ................ | 358/474 |
| 2006/0097941 | A1 * | 5/2006 | Bettner et al. ................ | 343/767 |
| 2008/0316118 | A1 * | 12/2008 | Puente Baliarda et al. ... | 343/702 |
| 2009/0021439 | A1 * | 1/2009 | Kanno et al. .................. | 343/767 |

* cited by examiner

*Primary Examiner* — Blane J Jackson

(74) *Attorney, Agent, or Firm* — Novak Druce Connolly Bove + Quigg LLP

(57) ABSTRACT

A wireless communication device includes a base board, a metal zone, and a filter. The metal zone and the filter are disposed on the base board. The metal zone defines a slot. The filter is connected to the slot to divide the slot into a first slot section and a second slot section. When a current having a first frequency flows through the first slot section and the second slot section, the filter is in an open circuit state, and the first slot section and the second slot section are activated to receive/transmit wireless signals having a first central frequency. When a current having a second frequency only flows through the first slot section, the filter is in a closed circuit state, and the first slot section is activated to receive/transmit wireless signals having a second central frequency.

11 Claims, 4 Drawing Sheets

WIRELESS COMMUNICATION DEVICE WITH SLOT ANTENNA

BACKGROUND

1. Technical Field

The present disclosure relates to a wireless communication device employing an antenna for receiving/transmitting dual-band wireless signals or multiband wireless signals.

2. Description of Related Art

Antennas are found in many wireless communication devices, such as mobile phones. A wireless communication device receives/transmits wireless signals having different frequencies, so requires the presence of a multiband antenna. However, many multiband antennas have complicated structures and are large in size, thereby making it difficult to miniaturize the wireless communication devices.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
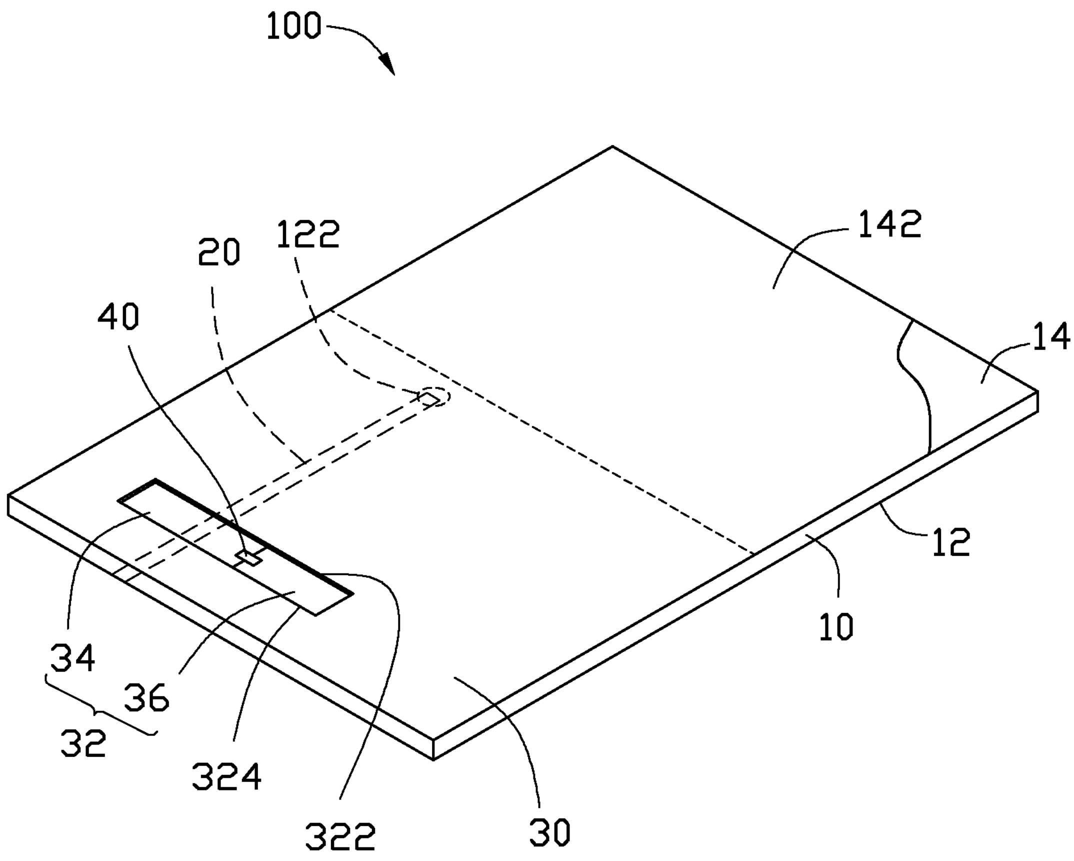
FIG. 1 is an isometric view of a wireless communication device, according to an exemplary embodiment.

FIG. 1 shows a wireless communication device 100 according to an exemplary embodiment. The wireless communication device 100 may be a mobile phone or a personal digital assistant, for example.

The wireless communication device 100 includes a base board 10, a microstrip 20, a metal zone 30, and a filter 40. The microstrip 20, the metal zone 30, and the filter 40 are all positioned on the base board 10.

In one exemplary embodiment, the base board 10 is a printed circuit board (PCB) of the wireless communication device 100, and is made of composite materials. The base board 10 includes a first surface 12 and a second surface 14 opposite to the first surface 12. A feed end 122 is formed on the first surface 12 to provide current. The second surface 14 forms a ground plane 142 to ground the wireless communication device 100.

The microstrip 20 is positioned on the first surface 12 of the base board 10, and is electronically connected to the feed end 122 to receive the current.

The metal zone 30 is formed on the second surface 14 of the base board 10, and is spaced from the microstrip 20. A space between the metal zone 30 and the microstrip 20 is small enough to allow the current to be coupled from the microstrip 20 to the metal zone 30 by current induction.

In addition, the metal zone 30 defines a slot 32. In one exemplary embodiment, the slot 32 is substantially rectangular and includes a first edge 322 and a second edge 324. The first edge 322 and the second edge 324 are opposite to each other, and both are perpendicular to the microstrip 20. When the current is coupled to the metal zone 30 from the microstrip 20, the current flows along the first edge 322 and the second edge 324. Thus, the metal zone 30 resonates to serve as a slot antenna. Moreover, the metal zone 30 is electronically connected to the ground plane 142, so the current is grounded by the ground plane 142.

Figure 2:
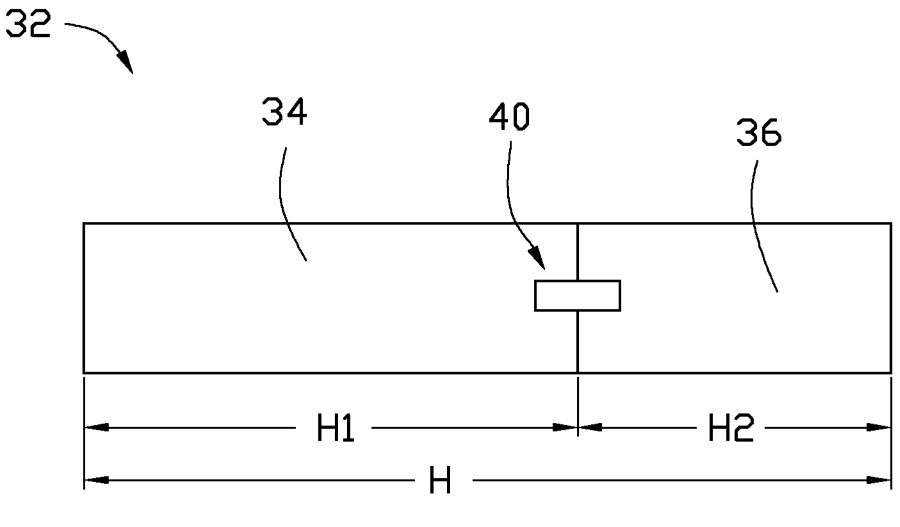
FIG. 2 is a schematic view of a slot of a metal zone of the wireless communication device.

Referring to FIG. 2, the filter 40 is received in the slot 32 and is connected to the first edge 322 and the second edge 324, thereby dividing the slot 32 into a first slot section 34 and a second slot section 36. The first slot section 34 is located above the microstrip 20. In one exemplary embodiment, a length of the slot 32 is H, a length of the first slot section 34 is H1, and a length of the second slot 36 is H2. If current having a first frequency flows into the first slot section 34 and the second slot section 36, the slot 32 is in a first resonance mode to receive/transmit wireless signals having a first central frequency. If current having a second frequency only flows into the first slot section 34, the first slot section 34 is in a second resonance mode to receive/transmit wireless signals having a second central frequency.

Figure 3:
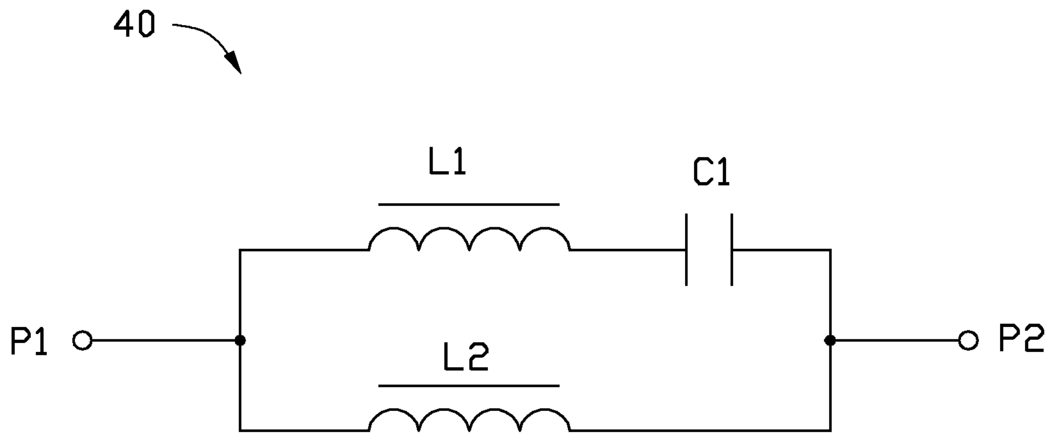
FIG. 3 is a circuit view of a filter of the wireless communication device.

The filter 40 can be a capacitor, an inductor, or any kind of circuit having capacitors and inductors. Referring to FIG. 3, in this exemplary embodiment, the filter 40 is a band-pass filter, and includes a first pin P1, a first inductor L1, a second inductor L2, a first capacitor C1, and a second pin P2. The first pin P1 is connected to the first edge 322 of the slot 32, and the second pin P2 is connected to the second edge 324 of the slot 32. The first inductor L1 and the first capacitor C1 are electronically connected between the first pin P1 and the second pin P2 in series, and are jointly and electronically connected to the second inductor L2 in parallel. Circuit parameters of the filter 40, such as a capacitance of the first capacitor C1, or an inductance of the first inductor L1 and the second inductor L2, are adjusted to allow either the current having the first frequency or the second frequency to pass through the filter 40.

If the wireless communication device 100 generates the current having the first frequency, the current having the first frequency flows from the microstrip 20 to the first slot section 34. When the current having the first frequency cannot pass through the filter 40, the filter 40 is in an open circuit state, and thus is disabled. Therefore, the current having the first frequency flows from the first slot section 34 to the second slot section 36, and the slot 32 is in the first resonance mode to receive/transmit wireless signals having the first central frequency. In this exemplary embodiment, when the filter 40 is in the open state, the wireless communication device 100 receives/transmits wireless signals having the first central frequency of about 1575 MHz, such as GPS signals.

In other exemplary embodiments, the location of the filter 40 can be changed to change the length H1, thereby changing the first central frequency.

If the wireless communication device 100 generates the current having the second frequency, the current having the second frequency flows from the microstrip 20 to the first slot section 34. When the current having the second frequency can pass through the filter 40, the filter 40 is in a closed circuit state, and thus is enabled. Therefore, the current having the second frequency cannot flow from the first slot section 34 to the second slot section 36, and the first slot section 34 is in the second resonance mode to receive/transmit wireless signals having the second central frequency. In this exemplary embodiment, when the filter 40 is in the closed state, the wireless communication device 100 can receive/transmit wireless signals having the second central frequency of about 2400 MHz, such as WiFi signals.

Figure 4:
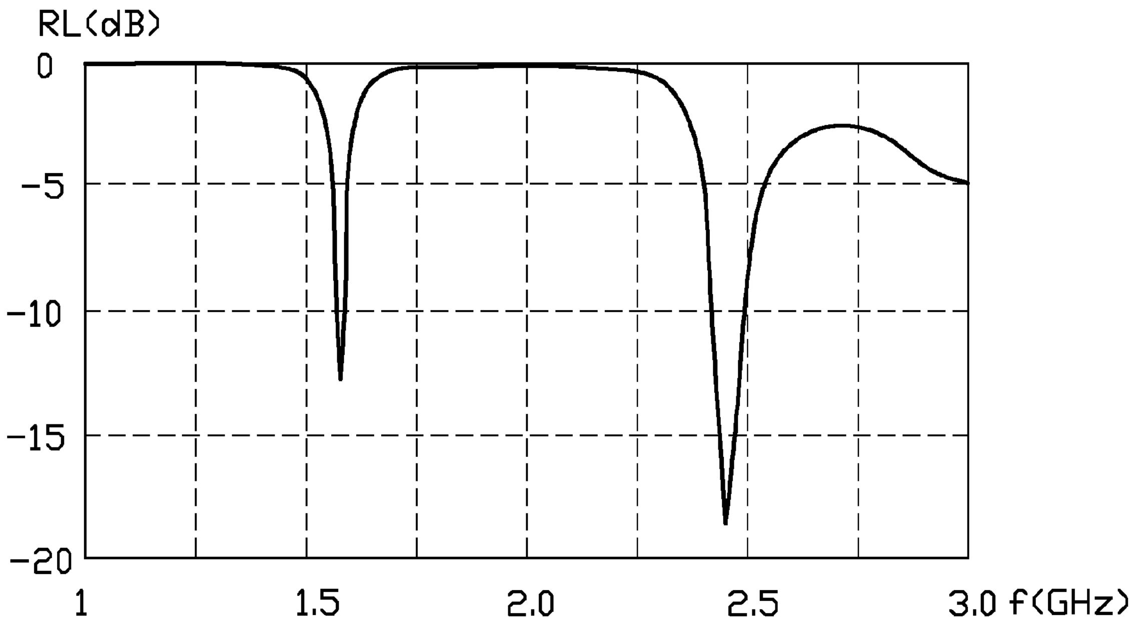
FIG. 4 is a return loss (RL) graph of the wireless communication device.

Referring to FIG. 4, when the wireless communication device 100 receives/transmits wireless signals at frequencies of about 1575 MHz and 2400 MHz, the return loss (RL) of the wireless communication device 100 is less than −10 dB, thereby satisfying communication standards.

In other exemplary embodiments, the filter 40 crosses over the slot 32, such that the first pin P1 and the second pin P2 are electronically connected to the first edge 322 and the second edge 324, respectively. In other words, if the filter 40 is received in the slot 32, the slot 32 is physically and electronically divided into the first slot section 34 and the second slot section 36. If the filter 40 is laid over the slot 32, the slot 32 is just electronically divided into the first slot section 34 and the second slot section 36.

In other exemplary embodiments, the slot 32 can be other shapes, such as U-shaped or other irregular shapes.

In other exemplary embodiments, the number of the filter 40 is two, such that both the filters 40 are received in the slot 32 to divide the slot 32 into three slot sections. Thus, the wireless communication device 100 can receive/transmit multiband wireless signals.

In summary, the filter 40 divides the slot 32 into the first slot section 34 and a second slot section 36. When the filter 40 is in the open circuit state, the first slot section 34 and the second slot section 36 are activated to receive/transmit wireless signals having the first central frequency. When the filter 40 is in the closed circuit state, the first slot section 34 is activated to receive/transmit wireless signals having the second central frequency. Thus, the wireless communication device 100 does not need complicated antenna structures and can have a small size. Additionally, the wireless communication device 100 has good communication quality at a plurality of frequency bands used in wireless communications.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A wireless communication device, comprising:

a base board;

a metal zone disposed on the base board, the metal zone defining a slot; and a filter disposed on the base board, and connected to the slot to divide the slot into a first slot section and a second slot section;

wherein when the first slot section receives a current having a first frequency, the filter is in an open circuit state, the first slot section and the second slot section are activated to receive/transmit wireless signals having a first central frequency; and wherein when the first slot section receives a current having a second frequency, the filter is in a closed circuit state, the first slot section is activated to receive/transmit wireless signals having a second central frequency; and wherein the slot comprises a first edge and a second edge opposite to the first edge, the filter is connected to the first edge and the second edge, the filter is a band-pass filter, the filter comprises a first pin, a first inductor, a second inductor, a first capacitor, and a second pin, the first pin is connected to the first edge of the slot, the second pin is connected to the second edge of the slot, the first inductor and the first capacitor are electronically connected between the first pin and the second pin in series, and are jointly and electronically connected to the second inductor in parallel.

2. The wireless communication device as claimed in claim 1, wherein the filter is received in the slot.

3. The wireless communication device as claimed in claim 1, wherein the filter crosses over in the slot, and is laid over the slot.

4. The wireless communication device as claimed in claim 1, further comprising a microstrip, wherein the microstrip is disposed on the base board, and the current is coupled from the microstrip to the metal zone.

5. The wireless communication device as claimed in claim 4, wherein the base board includes a first surface and a second surface opposite to the first surface, the microstrip is positioned on the first surface, the metal zone is formed on the second surface, and is spaced from the microstrip.

6. The wireless communication device as claimed in claim 4, wherein the first slot section is located above the microstrip, and the current is coupled from the microstrip to the first slot section.

7. A wireless communication device, comprising:

a base board;

a metal zone disposed on the base board, and defining a slot; and a filter disposed on the base board, and received in and connected to the slot to divide the slot into a first slot section and a second slot section;

wherein when a current having a first frequency flows from the first slot section to the second slot section, the first slot section and the second slot section are activated to receive/transmit wireless signals having a first central frequency; when a current having a second frequency flows from the first slot section to the filter, the first slot section is activated to receive/transmit wireless signals having a second central frequency, and wherein the filter is a band-pass filter, the current having the first frequency passes through the filter, and the current having the second frequency is prevented from passing through the filter; and wherein the filter comprises a first pin, a first inductor, a second inductor, a first capacitor, and a second pin, the first pin is connected to the first edge of the slot, the second pin is connected to the second edge of the slot, the first inductor and the first capacitor are electronically connected between the first pin and the second pin in series, and are jointly and electronically connected to the second inductor in parallel.

8. The wireless communication device as claimed in claim 7, wherein the slot comprises a first edge and a second edge opposite to the first edge, the filter is connected to the first edge and the second edge.

9. The wireless communication device as claimed in claim 7, further comprising a microstrip, wherein the microstrip is disposed on the base board, and the current having the first frequency and the current having the second frequency are coupled from the microstrip to the metal zone.

10. The wireless communication device as claimed in claim 9, wherein the base board includes a first surface and a second surface opposite to the first surface, the microstrip is positioned on the first surface, the metal zone is formed on the second surface, and is spaced from the microstrip.

11. The wireless communication device as claimed in claim 9, wherein the first slot section is located above the microstrip, and the current having the first frequency and the current having the second frequency are coupled from the microstrip to the first slot section.

* * * * *